United States Patent Office 3,076,047
Patented Jan. 29, 1963

3,076,047
POLYMERIZATION OF OLEFINS AND ALUMINUM HYDRIDE ACTIVATORS THEREFOR
Frank H. Seubold, Jr., Santa Ana, Calif., assignor, by mesne assignments, to Collier Carbon and Chemical Corporation, a corporation of California
No Drawing. Filed May 9, 1955, Ser. No. 507,171
10 Claims. (Cl. 260—683.15)

This invention relates to improvements in the art of polymerizing olefins, and to advantageous methods for the preparation of metal hydride activators, or promoters therefor. Briefly, in its most comprehensive aspect, the invention resides in the steps of (1) reacting an aluminum halide with a metal hydride in the absence of complex-forming media, both reactants being dispersed in an inert hydrocarbon medium, to form thereby a dispersion of highly active metal hydrides, including aluminum hydride ($AlH_3$), and (2) contacting the resulting dispersion with an olefin to form thereby a polymer of the olefin. The resulting polymer may then be recovered by hydrolysis, or other displacement reaction, from the telomeric aluminum residue.

Certain compounds containing covalent-bonded aluminum, e.g. the hydrides, the alkyls, the aryls and the like, have recently been found to be highly desirable activators for promoting the polymerization of olefins, particularly ethylene (cf. U.S. Patent 2,699,457). Not all such activators are equivalent however, and in fact some are markedly less active than others. This difference in activity may, in some cases, be due to the tendency of such compounds to form complexes with certain complex-forming solvents, e.g. diethyl ether, which are often used as media for the preparation of the hydrides, and/or for the subsequent olefin-polymerization. These ethers, as well as other compounds containing unshared electron pairs, form complexes postulated in the case of aluminum hydride as:

Such complexes have apparently been regarded as desirable activators, not inferior to the pure hydrides. It has now been found however, that when ether is employed, either as a medium for preparing the aluminum hydride, or as a medium for the olefin polymerization, the polymerization reaction is often sluggish and difficult to initiate.

Aluminum hydride may be prepared by reacting aluminum chloride in ether solution with another metal hydride, e.g. lithium hydride or lithium aluminum hydride (Finholt et al., J.A.C.S. 69 1199–1203). The reactions, neglecting the formation of polymers and complexes, are probably as follows:

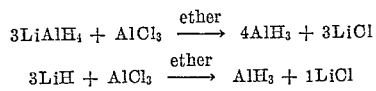

The monomeric aluminum hydride-ether complex presumably remains in solution, while the lithium chloride precipitates out. Polymeric aluminum hydride:

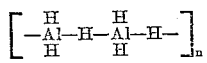

or an ether complex thereof, soon begins to precipitate also. The aluminum hydride is separated from the lithium chloride by rapidly filtering the reaction slurry in the absence of air and moisture. Evaporation of the ether solution leaves solid, polymeric aluminum hydride, at least a part thereof remaining complexed with the ether. It is ordinarily impossible to remove all the ether without also effecting extensive decomposition of the hydride. This preparation is in itself difficult, and is inexplicably erratic in results; for unknown reasons the reaction in ether does not always proceed, even on prolonged stirring. And even when successful, the ether-complexed product has been found to be less active for the subsequent olefin polymerization than the activator prepared by the methods of this invention.

It has also been observed that certain types of metal hydrides which contain an electrovalently bound metal in addition to covalent-bonded aluminum, e.g. lithium aluminum hydride, are disadvantageous polymerization promoters because their activity is relatively low, and the resulting olefin polymers are solid, salt-like products which are extremely difficult to purify. The polymers prepared with the herein described activators are at worst viscous liquids up to a high degree of polymerization. The degree of polymerization is also much greater than is obtainable under like conditions employing ether-complexed aluminum hydrides or alkyls prepared as described above, or employing ether-complexed aluminum alkyls prepared by the Grignard reaction.

From the above discussion it will be apparent that a primary object of the invention is to provide highly active covalent aluminum activators for the production of pure, easily recoverable olefin polymers. Another object is to provide reliable preparation methods capable of yielding activators of high, uniform activity. A specific object is to provide convenient methods for preparing aluminum hydride activators in the complete absence of complex-forming solvents such as ether. Other objects and advantages will be apparent from the more detailed description which follows.

ACTIVATOR PREPARATION

The term "activator" as employed herein is intended to designate the complex reaction product, or the active components thereof, which result from the interaction of aluminum halides with other metal hydrides under the described conditions. These products may or may not be true catalysts, in the strict sense of the word. They are ordinarily not recoverable in their initial form from the polymerized olefin product without special chemical treatment, but extremely minute quantities thereof are effective, and in this sense they are catalysts.

The activator is prepared by reacting an aluminum halide, e.g. aluminum chloride, aluminum bromide, aluminum fluoride or aluminum iodide, with slightly more of an alkali metal hydride, an alkaline earth metal hydride, or mixtures thereof, than is required to convert all of the aluminum halide to an aluminum hydride, and to combine with all of the halogen. Suitable examples of metal hydrides include lithium hydride, lithium aluminum hydride, sodium hydride, potassium hydride, beryllium hydride, calcium hydride, sodium beryllium hydride, sodium aluminum hydride, and the like. Typical reactions which are believed to occur include:

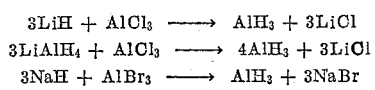

It appears possible however, in view of the highly active catalytic nature of the product, that the reaction mixture may include intermediate products, or other synergistic activators besides aluminum hydride. In any event, the experimental evidence shows that the original aluminum halide is substantially totally absent, or at least is inactivated, and also that at least the major part of the original metal hydride is converted to other more desirable activators.

The reaction is ordinarily conducted at between about 20° and 100° C., preferably between about 50° and 80° C., the metal hydride and the aluminum halide being finely powdered and suspended in an inert liquid hydrocarbon. The suspension is preferably agitated at the reaction temperature for a suitable period of time, about 10 minutes to 3 hours being sufficient in most cases, depending on the activity of the reactants and the temperature. Air and water must be carefully excluded, both during the preparation of the activator and the subsequent olefin polymerization. In the preferred modification, the powdered metal hydride, powdered aluminum halide and hydrocarbon medium are sealed in a clean, dry pressure vessel from which air has been displaced with an inert gas, and the mixture is agitated as by rocking. This technique reduces handling problems to a minimum, inasmuch as the polymerization reaction may then be initiated in the pressure vessel by admitting the desired olefin or olefins thereto. Contact with air is thus completely avoided, and the activator need not be transferred from one vessel to another. Removal of the inert reaction by-products, e.g. lithium chloride, is found to be unnecessary, as is also removal of the hydrocarbon medium.

The hydrocarbon dispersing medium may be any liquid paraffinic, naphthenic, or aromatic hydrocarbon, or mixtures thereof. Suitable examples include butane, isobutane, pentane, isopentane, hexane, heptane, octane, cyclohexane, dimethyl cyclopentane, methyl cyclopentane, methyl cyclohexane, dimethyl cyclohexanes, benzene, toluene, xylenes, ethylbenzene, trimethyl benzenes, cumene, and the like. Preferably the hydrocarbon should be relatively low-boiling in order to facilitate final separation thereof from the olefin polymers. Hydrocarbons boiling below about 150° C. are preferred, but substantially any non-reactive hydrocarbon of any boiling range which is liquid at the reaction temperature may be employed. The proportion of hydrocarbon employed is not critical, any amount sufficient to provide a non-viscous suspension being adequate. Typically, between about 1 and 20 ml. per gram of solid reactants is employed, but other proportions may be employed.

The activator prepared as outlined above may then be immediately employed without further treatment for activating the desired olefin polymerization. It is deemed preferable that the activator should in fact be utilized soon after the preparation thereof. Aluminum hydrides, as well as other metal hydrides are known to undergo more or less rapid auto-polymerization, resulting in the formation of large insoluble clumps of polymer. The reduction in available surface area brought about by such agglomeration may in some cases adversely affect the activity of the product.

OLEFIN POLYMERIZATION

The mechanism by which olefins are polymerized under the influence of the herein described activators apparently involves the successive addition of olefin units between the aluminum atom and the hydrogen atoms or alkyl residues attached to the aluminum. The extent of polymerization which is obtained depends on several process variables. The purity of the olefin is also an important consideration. The presence of polar compounds in the olefin tends to cause rapid inactivation of the activator and the formation of short-chain polymers. In order to obtain maximum benefit from the activator, it is therefore preferable to employ highly purified olefins.

In regard to process variables, the extent of polymerization, i.e. the average chain length of the polymer formed, depends principally upon four factors, viz. (1) the chemical constitution of the olefin or olefin mixture employed, (2) the temperature of polymerization, (3) the pressure under which polymerization is carried out, and (4) the ratio of olefin to activator. Ethylene is apparently the only olefin which, in pure state, is capable of forming long-chain polymers $(R)_x$, wherein $x$ is greater than about 3. The higher olefins, e.g. propylene, butylene, isobutylene, will readily combine with aluminum hydride at low temperatures, e.g. 40° to 60° C., to form monomeric aluminum alkyls wherein the alkyl groups contain the same number of carbon atoms as the original olefin. Upon raising the temperature to, for example 80° to 200° C., these inititally formed aluminum alkyls will, in most cases, react with additional olefin to form aluminum alkyls wherein the alkyl groups contain twice the number of carbon atoms as the original olefin. At this stage however it is difficult to increase the chain length of the polymer by the continued addition thereto of hgiher olefins. Further heating to increase the polymerization tends to result in decomposition of the aluminum alkyl to form unsaturated hydrocarbons containing twice the number of carbon atoms as the original olefin, e.g. octenes in the case of butylene, and hexenes in the case of propylene. Ethylene however may be reacted with such aluminum dimeralkyls to increase indefinitely the chain length of the alkyl groups.

When ethylene is employed, the average length of the alkyl groups attached to aluminum may be increased indefinitely, depending upon temperature and pressure. By maintaining temperatures between about 110° and 200° C. for example, and ethylene pressures of 10 to 1000 atmospheres, viscous polymers may be obtained melting at 90° to 100° C., and having an average molecular weight in excess of about 20,000.

The polymers obtained may be either substantially saturated, or a predominantly unsaturated product may be obtained. Raising the temperature of polymerization tends to decrease the chain length of the polymer through cracking reactions, and to increase the degree of unsaturation thereof. Low pressures of ethylene also tend to increase the unsaturation of the product and to decrease its molecular weight.

To obtain a substantially saturated polymer, pure ethylene may be pressured into an autoclave containing a small proportion of the activator, and when the pressure drops to an undesirable level, additional ethylene is pressured into the vessel, and this procedure is repeated until a polymer of the desired chain length is obtained. The temperature may preferably range between about 90° and 150° C., and the average ethylene pressure may range between about 10 and 1000 atmospheres. Upon completion of the polymerization, the reaction product may be utilized as such, or it may be treated for removal of the aluminum residue contained therein. To remove the aluminum and produce a saturated polymer, the product may be subjected to hydrolysis with water, acid or alkali, or it may be treated with alcohols or the like. The polymer is then obtained as a saturated paraffin, and the aluminum as a salt, hydroxide or alkoxide. The final product may also contain a small proportion of the by-product metal halide, e.g. lithium halide, which was produced during preparation of the activator. All of these metal contaminants may suitably be removed by washing the product with water and/or alkaline, or acid solutions.

The polymerization conditions may be controlled, as indicated above, to obtain low-molecular weight unsaturated hydrocarbons of substantially any desired configuration. The olefins obtained by conducting the polymerization at high temperatures and/or low pressures may be either alpha-olefins, or internal olefins, depending primarily upon the temperature. The olefins which are produced by the cracking of hydrocarbon fragments from or on the aluminum nucleus are presumably initially largely alpha-olefins, but the double bond may be shifted under the catalytic influence of the aluminum if the temperatures are sufficiently high. If pure alpha-olefins are desired, they may be obtained for example by conducting the polymerization at 110–170° C. A product containing larger proportions of internal olefins may be obtained by raising the temperature of the reaction to for example 150° to 250° C.

To obtain unsaturated high-molecular weight polymers, the polymerization may be carried out in the same manner as described above in connection with saturated polymers, but the reaction product may be treated differently. It may for example be subjected to an exchange reaction with ethylene in the presence of a reduced group VIII metal, e.g. nickel, cobalt, iron or the like, whereby the hydrocarbon chains on the aluminum are replaced by ethylene groups, without however effecting hydrogenation of the displaced polymer, which is recovered as olefins, predominantly alpha-olefins.

The proportion of activator employed to obtain the above described results depends primarily upon purity of the olefin. When employing pure ethylene, one part by weight of activator, calculated as aluminum hydride, may be capable of effecting polymerization of from 10 to 10,000 parts by weight of ethylene. When employing impure olefins, larger quantities of activator are normally required, and this amount can be readily ascertained by maintaining surveillance on the rapidity of pressure drop in the autoclave following admission of fresh olefin thereto. A slow pressure drop indicates a sluggish reaction, while a rapid pressure drop indicates that the activator is still functioning effectively.

It will be apparent from the above discussion that the following general principles among others are controlling in the polymerization reaction:

(1) Ethylene is an essential operable olefin for producing polymers of high molecular weight.
(2) Higher olefins may be employed either to produce terminal or intermediate branching on the poly-ethylene chains.
(3) Higher olefins may also be employed to produce dimeric paraffins, or dimeric olefins.
(4) The nature of the polymer may be varied at will by controlling the temperature and/or pressure under which polymerization is carried out.
(5) Polymers of high molecular weight can be obtained when employing ethylene, ethylene plus other olefins, or ethylene sequentially with other olefins, but not with higher olefins alone.

By observing the above conditions those skilled in the art will find the production of substantially any desired saturated or unsaturated polymer to be readily attainable. Other ancillary factors to be observed in the polymerization may be found in the above noted U.S. Patent 2,699,457. The polymerization step of the present invention is substantially similar to the polymerization reactions described in the said patent, with the exception that the activators employed herein are more active than the majority of the activators described in the patent. Hence, in general, lower temperatures and/or lower pressures and/or lesser contact times will be employed herein to obtain equivalent results.

The following examples may serve to illustrate more specifically certain critical aspects of the invention, but they should not be construed as limiting in scope.

*Example I*

Ten grams of powdered lithium aluminum hydride, 10 grams of powdered aluminum chloride and 50 ml. of pure cyclohexane were sealed under nitrogen into a 300 ml. stainless steel bomb which had been previously flushed with nitrogen. The bomb was then rocked for one hour at about 70° C. Ethylene was then pressured in until the gauge pressure reached 980 p.s.i. Agitation was continued for about 30 minutes during which time the temperature was observed to decline from 65° to 63° C., while the pressure declined only to 800 p.s.i.g. The absence of initial rapid polymerization shows that no aluminum chloride remained in the vessel, since ethylene polymerizes rapidly in the presence of aluminum chloride at these temperatures. The excess ethylene was then exhausted from the vessel.

The bomb was subsequently repressured with ethylene to 700 p.s.i.g. at room temperature (about 28° C.), and the temperature was gradually raised over a period of 2 hours to about 102° C. while the pressure rose to 1050 p.s.i.g., whereupon the temperature rose sharply to 124° C., and the pressure dropped to 750 p.s.i.g., indicating the initial reaction of aluminum hydride with ethylene to form aluminum triethyl. Heating was then continued for an additional 2.2 hours at 99°–104° C., during which the pressure dropped only slightly, indicating no further reaction at this temperature. Additional ethylene was added, and the temperature was then raised to 121° C., whereupon the pressure dropped from 900 to 700 p.s.i.g in 2 hours. Additional ethylene was added, and the pressure dropped from 1150 to 820 p.s.i.g. in 50 minutes at 132° C. The vessel was three times repressured with ethylene, and in the first case the pressure dropped from 1050 to 500 p.s.i.g. in 3 hours at 117°–122° C.; in the second case it dropped from 1000 to 520 p.s.i.g. in 2 hours at about 120° C., while in the third case the pressure dropped from 1200 to 820 p.s.i.g. in 1 hour at about 124° C. A total pressure drop of 2920 p.s.i.g. was observed.

The bomb was then cooled and depressured, and 108 grams of a light gray, viscous polyethylene liquid was recovered which appeared stable in air. This example shows that the activator of this invention is very active, even at comparatively low pressures (below 80 atmospheres) and low temperatures (below 120° C.), and for producing high molecular weight, viscous polymers of ethylene.

*Example II*

Example I is repeated employing 2.2 grams of lithium hydride in place of the lithium aluminum hydride. It is observed in this case that the initial reaction with aluminum chloride is somewhat more sluggish, but the activator when formed gives substantially the same results in the polymerization of ethylene.

*Example III*

This example shows the results obtainable by carrying out the polymerization of ethylene at somewhat higher temperatures. Ten grams of powdered lithium aluminum hydride, 10 grams of powdered aluminum chloride and 100 ml. of cyclohexane were sealed in an 1100 ml. stainless bomb and rocked for one hour at about 70°–82° C. to form the activator.

The vessel was then pressured with ethylene and heated gradually to 93° C. The bomb was then repressured to 1100 p.s.i.g., and polymerization was continued at 150°–170° C. for about 9 hours. During this period the bomb was repressured with ethylene on 9 occasions to maintain pressure levels varying between 300 and 990 p.s.i.g., the sum of the observed pressure drops being about 4000 p.s.i.g.

The bomb was then cooled, and the liquid product forced out under nitrogen pressure. About 529 grams of a clear, pale-yellow, slightly viscous liquid was recovered. An attempt to fractionate a portion of the product failed to produce any significant amounts of lower olefins, indicating that much of the polymer was still combined with aluminum.

In order to displace the aluminum and produce olefinic polymers, the product was replaced in the bomb under nitrogen, together with 10 grams of reduced nickel-alumina catalyst, and pressured to about 10 p.s.i.g. with acetylene. The acetylene was added to inhibit the isomerization activity of the nickel catalyst. Ethylene was then added to an initial pressure of 810 p.s.i.g., and the mixture was rocked and heated for about 3 hours at 80°–100° C. to catalyze the displacement of polymeric olefins by ethylene groups. In order to decompose the triethyl aluminum formed in the displacement reaction, the entire product was added dropwise with stirring to 100 ml. of concentrated hydrochloric acid in 300 ml. of water. Continuous evolution of ethane was observed, and the mixture was stirred until hydrolysis appeared complete. The organic layer was separated, washed with water, aqueous sodium bicarbonate, and again with water, and dried over sodium sulfate. The final product gave upon fractionation the following fractions:

TABLE I

| Fraction | Boiling Range, ° C. | Pressure | $n_D^{20}$ | Vol., ml. | Br. No. | Mol. Wt. |
|---|---|---|---|---|---|---|
| 1 | 64–75 | Atm | 1.4039 | 80 | 95 | |
| 2 | 75–80 | Atm | 1.4189 | 100 | | |
| 3 | 80–82 | Atm | 1.4231 | 100 | | |
| 4 | 82–119 | Atm | 1.4189 | 17 | | |
| 5 | 119–122 | Atm | 1.4128 | 13 | 125 | |
| 6 | 52–85 | 50 mm | 1.4211 | 19 | | |
| 7 | 85–90 | 50 mm | 1.4248 | 35 | 105 | 163 |
| 8 | 90–116 | 50 mm | 1.4259 | 11 | | |
| 9 | 116–126 | 50 mm | 1.4309 | 29 | 92 | 197 |
| 10 | 50–66 | 2 mm | 1.4324 | 23 | 86 | 191 |
| 11 | 97–101 | 2 mm | | 10 | | |
| Residue | | | | 118 Gm. | 48 | 253 |

Fractions 1, 5, 7, 9, 10 and the residue were then subjected to infra-red spectranalysis to obtain an estimate of the proportion of α-olefins present. The results were as follows:

Fraction: Mole percent α-olefins
1 ---------------------------------------- 46
5 ---------------------------------------- 54
7 ---------------------------------------- 48
9 ---------------------------------------- 45
10 --------------------------------------- 39
Residue ---------------------------------- 26

These results show rather extensive isomerization as a result of contact with the aluminum alkyl catalyst at high temperatures. By carrying out the polymerization at lower temperatures (100°–140° C.) and higher pressures (100–1000 atmospheres) a product is obtained containing a higher proportion of α-olefines, of higher average molecular weight.

*Example IV*

This example illustrates use of the activator for dimerizing higher olefins, i.e. propylene. The activator was prepared as in Example III by shaking 10 gms. of lithium aluminum hydride, 10 gms. of aluminum chloride and 100 ml. of cyclohexane under nitrogen in a 1 liter bomb for one hour at about 66° C.

The bomb was then placed in a Dry Ice bath cooled to −80° C., gas-evacuated, and partially filled with 300 g. of liquid propylene. The bomb was then sealed, and the temperature was gradually raised to about 120° C., whereupon an exothermic temperature rise was noted, indicating the initiation of reaction. Heating was continued at 120°–210° C. for another hour, during which the pressure rose to a maximum of 1110 p.s.i.g. at 185° C., and then fell to 800 p.s.i.g. at 210° C. The reaction was then presumed to be complete and heating was discontinued.

The product was worked up by nickel-catalyzed ethylene displacement and acid hydrolysis as described in Example III, and then subjected to distillation. A total of about 160 grams of propylene dimer (2-methyl-1-pentene) was recovered. The total product boiling higher than the dimer amounted to about 70 grams.

*Example V*

In order to compare the relative activity of the ether complexes of aluminum alkyls, the polymerization of ethylene was attempted employing triethyl aluminum etherate, $Al(C_2H_5)_3 \cdot ¾(C_2H_5)_2O$, prepared by the Grignard reaction. Fifteen ml. of the etherate and 50 ml. of cyclohexane were placed in a 300 ml. stainless steel bomb under nitrogen, and the vessel was then pressured with ethylene at 10° C. An initial pressure drop of 600 p.s.i.g. was noted while the cyclohexane was being saturated with ethylene. The bomb was then heated gradually with shaking while noting temperature and pressure at the following time intervals:

TABLE 2

| Time | P.s.i.g. | T., ° C. |
|---|---|---|
| 11:17 | 750 | 10 |
| 11:45 | 1,000 | 54.5 |
| 12:04 | 1,570 | 110 |
| 12:32 | 2,070 | 154.5 |
| 12:40 | 2,000 | 149 |
| 12:47 | 1,960 | 149 |
| 1:15 | 2,100 | 154.5 |
| 1:50 | 2,350 | 183 |
| 2:05 | 2,200 | 177 |
| 2:35 | 2,100 | 171 |
| 3:05 | 2,150 | 177 |
| 4:00 | 2,050 | 177 |

Thus, in 3.5 hours of heating at 150°–180° C., and at pressures above 2000 p.s.i.g., only a very small pressure drop occurred, indicating very little reaction. Examples I–IV, on the other hand show large and rapid pressure drops at lower temperatures and pressures, indicating a much higher activity for the ether-free activator prepared in situ.

*Example VI*

This example shows that lithium aluminum hydride alone is not equivalent to the activators employed in Examples I–IV. The activator employed was 10 grams of lithium aluminum hydride dispersed in 50 ml. of cyclohexane. The polymerization procedure, employing ethylene, was similar to that described in Example I. The bomb was pressured with ethylene to 920 p.s.i.g. at room temperature, and gradually heated to 93°–94° C. Heating was continued for two hours at 94°–121° C. The absorption of ethylene was slow; in fact ethylene was twice released from the bomb to maintain the pressure below 2000 p.s.i.g., but the pressure never dropped below 1500 p.s.i.g.

After standing overnight at room temperature the bomb was reheated to 135° C. and repressured with ethylene to 720 p.s.i.g. Heating was continued for three hours at 116°–132° C., when the pressure had dropped to 530 p.s.i.g. The bomb was then repressured with ethylene to 900 p.s.i.g. and heating was continued for another three hours at 121°–127° C., when the pressure had dropped to 820 p.s.i.g. Since very little ethylene was being absorbed, the reaction was terminated and the pressure released. Upon opening the bomb, the product was found to consist of a tough, gray waxy solid coating the walls of the bomb, and was highly pyrophoric. Since the product was not of the nature desired it was destroyed by burning, followed by decomposition with water. The solid nature of the product is probably characteristic of its ionic nature as lithium aluminum alkyl, rather than of any high degree of polymerization.

This example shows that lithium aluminum hydride is not only less active than the activators of Examples I–IV, but produces an undesired salt-type product.

Those skilled in the art will appreciate that the details of the above described procedures may be varied considerably to obtain the same ends. The description therefore should not be construed as limiting in scope, in the absence of explicit statements to that effect. The true scope of the invention is intended to be embraced by the following claims or their equivalents.

I claim:

1. A process for preparing an aluminum hydride polymerization activator which comprises forming a reaction mixture consisting essentially of powdered aluminum chloride, sufficient of a powdered metal hydride to react with all of the halogen of said aluminum halide, and an inert liquid hydrocarbon dispersing medium, and agitating said mixture at a temperature between about 20° and 100° C., until said aluminum halide is converted to aluminum hydride, said reaction being carried out in the absence of water, air, and compounds capable of forming complexes with aluminum hydride, said metal hydride being selected from the class consisting of alkali metal hydrides, alkaline earth metal hydrides, and alkali metal-aluminum hydrides.

2. A process as defined in claim 1 wherein said metal hydride is an alkali metal hydride.

3. A process as defined in claim 1 wherein said metal hydride is lithium aluminum hydride.

4. A process as defined in claim 1 wherein between about 1 and 20 ml. of said hydrocarbon is employed per gram of solid reactants.

5. A process as defined in claim 1 wherein said hydrocarbon is cyclohexane.

6. A process for polymerizing an olefin which comprises first forming a polymerization activator by reacting at 20° to 100° C. powdered aluminum chloride with sufficient of a powdered metal hydride to combine with all of the chlorine of said aluminum chloride in the presence of an inert liquid hydrocarbon medium, and continuing said reaction until all of said aluminum chloride has been converted to an aluminum hydride, said reaction being conducted in the absence of air, water, and compounds capable of forming complexes with aluminum hydride, then without removing said hydrocarbon medium, contacting the entire reaction mixture with an aliphatic olefin containing two to four carbon atoms under superatmospheric pressure and continuing said contacting for a sufficient length of time to effect polymerization of said olefin, and thereafter recovering an olefin polymer from the polymerization reaction, said metal hydride being selected from the class consisting of alkali metal hydrides, alkaline earth metal hydrides, and alkali metal-aluminum hydrides.

7. A process as defined in claim 6 wherein said olefin is ethylene.

8. A process as defined in claim 6 wherein said olefin is propylene.

9. A process as defined in claim 6 wherein said metal hydride is lithium aluminum hydride, and said olefin is ethylene.

10. A process as defined in claim 6 wherein said hydrocarbon medium is cyclohexane.

References Cited in the file of this patent

UNITED STATES PATENTS

| | | |
|---|---|---|
| 1,958,012 | Muckenfuss | May 8, 1934 |
| 2,567,972 | Schlesinger et al. | Sept. 18, 1951 |
| 2,695,327 | Ziegler et al. | Nov. 23, 1954 |
| 2,731,453 | Field et al. | Jan. 17, 1956 |
| 2,765,329 | Lindsey | Oct. 2, 1956 |
| 2,781,410 | Ziegler et al. | Feb. 12, 1957 |
| 2,826,598 | Ziegler et al. | Mar. 11, 1958 |

FOREIGN PATENTS

| | | |
|---|---|---|
| 504,161 | Belgium | July 14, 1951 |
| 506,229 | Italy | Dec. 21, 1954 |

OTHER REFERENCES

Ipatieff: "Catalytic Reactions," published by Macmillan (New York), 1936 (pages 566 and 713–716 relied on).

Thomas: "Anhydrous Aluminum Chloride in Organic Chemistry," published by Reinhold (New York), 1941 (pages 24 and 25 relied on).